United States Patent [19]
Stainton et al.

[11] Patent Number: 5,094,126
[45] Date of Patent: Mar. 10, 1992

[54] TRANSMISSION WITH A DETACHABLE EMERGENCY RATIO SELECTOR

[75] Inventors: John E. Stainton, Chorley; Barry D. Thomas, Manchester; Richard A. Nellums, Chorley; Paul M. Fowler; John S. Tuson, both of Preston, all of England

[73] Assignee: Eaton Corporation, Cleveland, Ohio

[21] Appl. No.: 461,872

[22] Filed: Jan. 8, 1990

[30] Foreign Application Priority Data

Jan. 25, 1989 [GB] United Kingdom ............... 8901605

[51] Int. Cl.$^5$ ............................................. B60K 41/16
[52] U.S. Cl. ........................................ 74/861; 74/335; 364/424.1
[58] Field of Search ................ 364/424.1; 74/335, 861

[56] References Cited

U.S. PATENT DOCUMENTS

| | | | |
|---|---|---|---|
| 4,555,959 | 12/1985 | Braun | 74/335 |
| 4,570,502 | 2/1986 | Klatt | 74/335 |
| 4,718,307 | 1/1988 | Yabe et al. | 74/335 |
| 4,788,875 | 12/1988 | Genise | 74/335 |
| 4,796,485 | 1/1989 | Ebina | 74/335 |
| 4,821,590 | 4/1989 | Tury et al. | 74/335 |
| 4,873,881 | 10/1989 | Edelen et al. | 74/335 |
| 4,899,607 | 2/1990 | Stainton | 74/335 |
| 4,913,004 | 4/1990 | Panoushek et al. | 74/861 |
| 4,922,769 | 5/1990 | Tury | 74/335 |
| 4,928,544 | 5/1990 | Markyvech et al. | 74/335 |

FOREIGN PATENT DOCUMENTS

| | | | |
|---|---|---|---|
| 60-69355 | 4/1985 | Japan | 74/861 |
| 60-81546 | 5/1985 | Japan | 74/861 |
| 60-95245 | 5/1985 | Japan | 74/861 |
| 60-172755 | 9/1985 | Japan | 74/861 |
| 61-124748 | 6/1986 | Japan | 74/861 |
| 61-124749 | 6/1986 | Japan | 74/861 |
| 61-130650 | 6/1986 | Japan | 74/861 |
| 61-180050 | 8/1986 | Japan | 74/861 |
| WO89/06195 | 7/1989 | World Int. Prop. O. | 74/335 |

OTHER PUBLICATIONS

Sae Technical Paper #850782.
Sae Technical Paper #861170.

Primary Examiner—Richard Lorence
Assistant Examiner—Daniel Wittels
Attorney, Agent, or Firm—H. D. Gordon

[57] ABSTRACT

An emergency device (2) for allowing manual limp home/get off road shifting of an automatic/semiautomatic mechnical transmisssion of the type having an electrically controlled shifter (30) including a plurality of electrically initialed shifting drivers (solenoids S1–S6) is provided.

4 Claims, 2 Drawing Sheets

TRANSMISSION WITH A DETACHABLE EMERGENCY RATIO SELECTOR

BACKGROUND OF THE INVENTION

1. Field of the Invention

The present invention relates to an emergency device for energizing electrically powered gear-shifters in a transmission, in an emergency.

2. Description of the Prior Art

Typically, but not exclusively, the gear-shifters for fully or partially automated mechanical type transmissions are nowadays powered by pneumatic high and low (or exhaust) pressure sources controlled by solenoids.

Transmissions, especially on heavy vehicles, are shifted in ratio by such driving means in order to take the effort of gear-shifting away from the driver or operator. The transmission may be entirely automatic, wherein all shifting activity, including synchronization and decisions to shift, as to when and into which ratio, are all totally automatic. The transmission may be semi-automatic, where the shift decisions are manual but most or all of the accomplishment of the shifting is automatic. Alternatively, the transmissions may be power assisted wherein only the shifting from one ratio to the other may be powered, i.e. shifts are manual, but are assisted by the electrically controlled pneumatic powering. The invention is concerned with enabling a driver to select one reverse and at least one forward ratio of those normally available, whenever the usual electronic computer unit (ECU) or multi-wired distributor has failed or is distrusted but when there can still be hope that the electric drivers are still operative. Hereinafter this specification considers only electrically selected and electrically controlled shifting, however the electrical selection signals are generated and distributed, and whatever pneumatic or other electromechanical device may relay the electrical signals into power for shift-driving. Presently preferred embodiments comprise solenoid-controlled pneumatic powered shifters of the type sometimes called "X-Y" shifters or drivers.

The invention is not therefore concerned with the oil powered (non-electrical) automatic transmissions typical of today's automobiles.

SUMMARY OF THE INVENTION

The typical gear driving pattern of the present invention is a neutral trunk line or slot (on a notional X-axis) and blind branches (in notional Y-directions) substantially perpendicular to the neutral line, to select each ratio. This is, of course, the well known "H", "double H" or "H and a half" type shifting pattern.

According to the present invention, a detachable emergency electrical unit for use with an electrically controlled transmission for a limp-home or a limp-off-the-road facility, has flexed plural binary signal wires for connecting into an electrical driver assembly (e.g. an X, Y box having six solenoids), such assembly typically forming a part of the existing) transmission to which the inventive unit constitutes an emergency auxiliary, and a multi-position switch, the positions thereof forming a series or sub-series of which one end position is a reverse-determining position (R), the other end position is a given forward ratio-determining position (F2), wherein selection of the given forward ratio from a reverse engagement involves finite protection against selection of reverse again.

For instance a selection of the forward ratio by movement along the neutral slot (N) and/or an oppositely directed Y movement will involve different solenoids energized ON from those involved in selection of reverse; furthermore between the two end positions are at least two different neutral switch positions (N1, N2) somewhere along the slot, whereat different preparatory neutral positionings are designated; different neutral positionings being defined along said neutral trunk line, and preparatory positionings being defined as those adjacent or confronting those blind branches (AR, AF2) corresponding to reverse and to the given forward ratio (second). It is greatly preferred that the reverse shifting alley (AR) be not located opposite a forward shifting alley (AF2), or that an interlock prevents direct shifting of a selection finger between any reverse and any forward ratio alley.

There may be one further preparatory neutral switch (position N2) also confronting the given ratio (F2) and a further forward ratio (first or F1) involving a blind branch (AF1) opposite or confronting the given one (F2 or second). If a third forward ratio is to be provided for in emergencies, (which is presently considered a most unnecessary complication for emergencies), another two preparatory neutral positions would precede the third forward ratio. It will be observed that three of the above five neutral switch positions (N2) correspond to the same neutral positioning, e.g. a selector finger confrontation with the first two mentioned forward ratio branches (AF1, AF2).

The choice of the given forward ratio minimizes the dangerous possibility of electrical defects causing reverse to be selected for forward or vice versa.

It is strongly preferred, for additional safety, to have one power-on reassurance indicator or light (4) and a second electrical driver-OK reassurance indicator (5) to indicate that the drivers (solenoids S1–S6) selected by the existing switch position are neither open or close circuit. If two or three drivers should be activated, for example, and each has a nominal resistance of 46 ohms, the combined resistance should be within about 15% of 23 or 15 ohms, and the indicator could signal verification of this acceptable value, as appropriate. It is safer to make light illuminated the reassurance indication, because the positive indication also indicates that the light bulb itself, is operative. A single short-circuited solenoid could in practice appear to present less than 10 ohms resistance, and an open-circuited one in excess of 1000 ohms.

BRIEF DESCRIPTION OF THE DRAWINGS

FIG. 1 shows a gear selection pattern, comprising neutral trunk and a plurality of ratio blind alleys or branches, for a selector finger or the like.

DESCRIPTION OF THE PREFERRED EMBODIMENT

Figure 1:
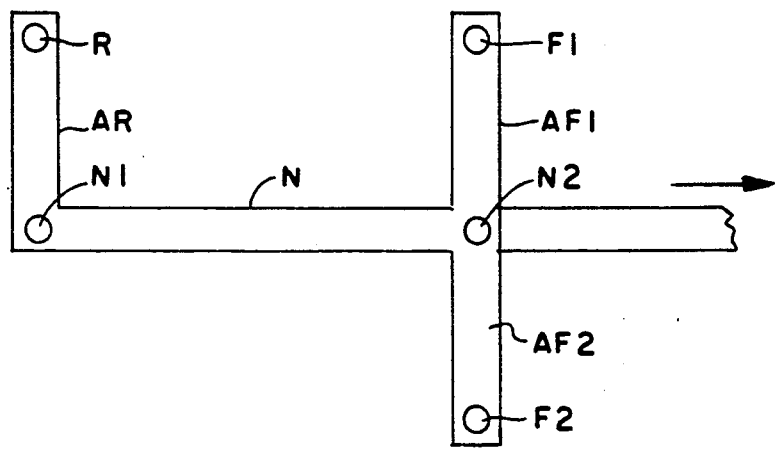

In FIG. 1 and all the following Figures and description, the main gearbox of the Eaton Corporation "SAMT" transmission is referred to, but the invention has application to many types of transmissions. The "Twin Splitter" gear train used in the "SAMT" transmission has twin countershafts and a three speed rear auxiliary splitter gearbox, with which auxiliary section we are not concerned. The emergency device on the present invention only changes ratios in the front or main transmission section.

The "Twin-Splitter" transmission and the "SAMT" transmission may be seen by reference to U.S. Pat. Nos. 4,735,109 and 4,648,290, respectively, the disclosures of which are hereby incorporated by reference.

Referring to the gate pattern of FIG. 1, in which gear selection alleys A branch as shown vertically off a neutral slot N, a selector finger (not shown) may be driven anywhere along slot N, whereat other means (not shown) connected with the finger determine the mainbox neutral state. A horizontal or X-shift of the finger to the neutral position N1, and then a vertical or Y-shift along to the end R of reverse alley AR will select reverse. Shifting the finger back via neutral positions N1 and N2 to the end position F2 of forward alley AF2 will select mainbox second gear (forward). It is considered mostly satisfactory for an emergency system to be able to select just one forward and one reverse gear.

The neutral positions N1 and N2 are preparatory neutrals, ready for the finger to enter alley AR or AF2 (or another alley AF1 opposite AF2).

True neutral, e.g. with a mechanical detent, in which the vehicle will normally be left when non-operative, may or may not be opposite an alley A, but all positions on slot N are neutral-determining positions of the selector finger. Circles such as N1 or F1 denote positions of the finger, which are in fact already provided for in the Eaton Corporation "SAMT" transmission already mentioned.

There need be no physical detents at these circled positions when the electrical drivers are thus capable of placing the finger accurately and stably there.

The "SAMT" transmission has three stable X drivers which can locate the finger stably at N1 or N2 (or another neutral in the direction of arrow 1 to confront two further forward ratio alleys). Such stable preparatory neutral positions will be necessary for operation of the inventive limp-home device. The "SAMT" transmission also has three Y drivers, to drive the finger to the neutral slot N, to the "top" end of upwardly shown alleys AR and AF1, or to the "bottom" end of downwardly shown alley AF2, these are used in normal driving, and are therefore helpful in this limp-home arrangement to find second forward (or second and first) and reverse.

Figure 3:
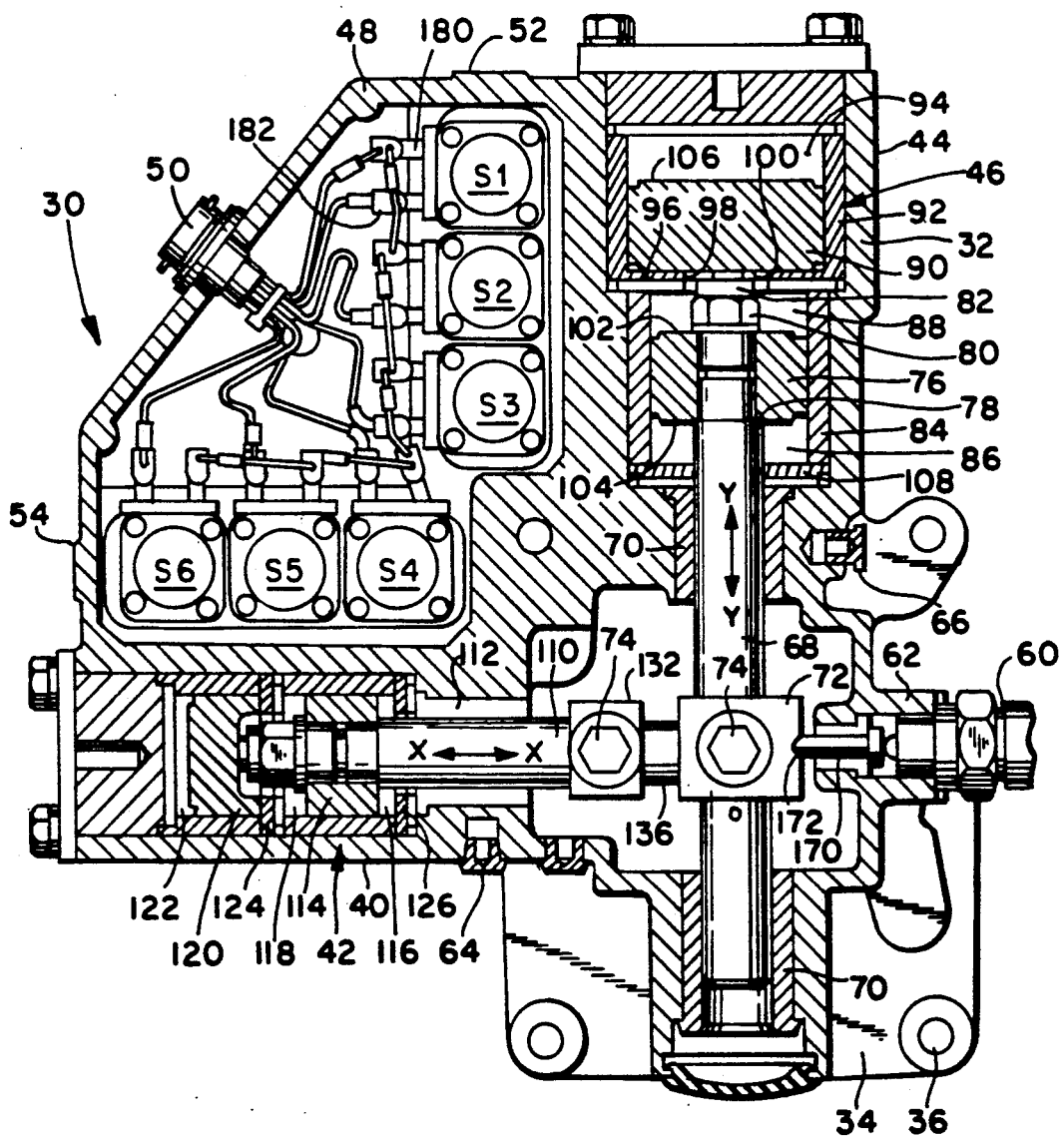
FIG. 3 shows essential components in plan of an X-Y solenoid shifter unit.

For further details of the "SAMT" transmission, particularly the X-Y shifting drivers, reference should be made to above-mentioned U.S. Pat. No. 4,648,290 from which the attached FIG. 3 is an extract, or EP-A-170 465. FIG. 3 shows X-shifting enclosures or cylinders 116, 118 and 122 and Y-shifting pneumatic enclosures or cylinders 86, 88 and 94, which are fed high or low (or exhaust) pressure by six solenoids 150-160 first flexible cable connector 50 is provided for electrically connecting the solenoids to a source of energizing power. Rods 110 and 68 then couple the X and Y commands to move block 72 and finger 74 e.g. in a rotary manner.

Fluid actuated, electrically controlled transmission shifters may be seen by reference to U.S. Pat. Nos. 4,722,237; 4,748,863 and 4,445,393; and allowed U.S. patent application Ser. No. 261,454, filed Oct. 24, 1988.

Figure 2:
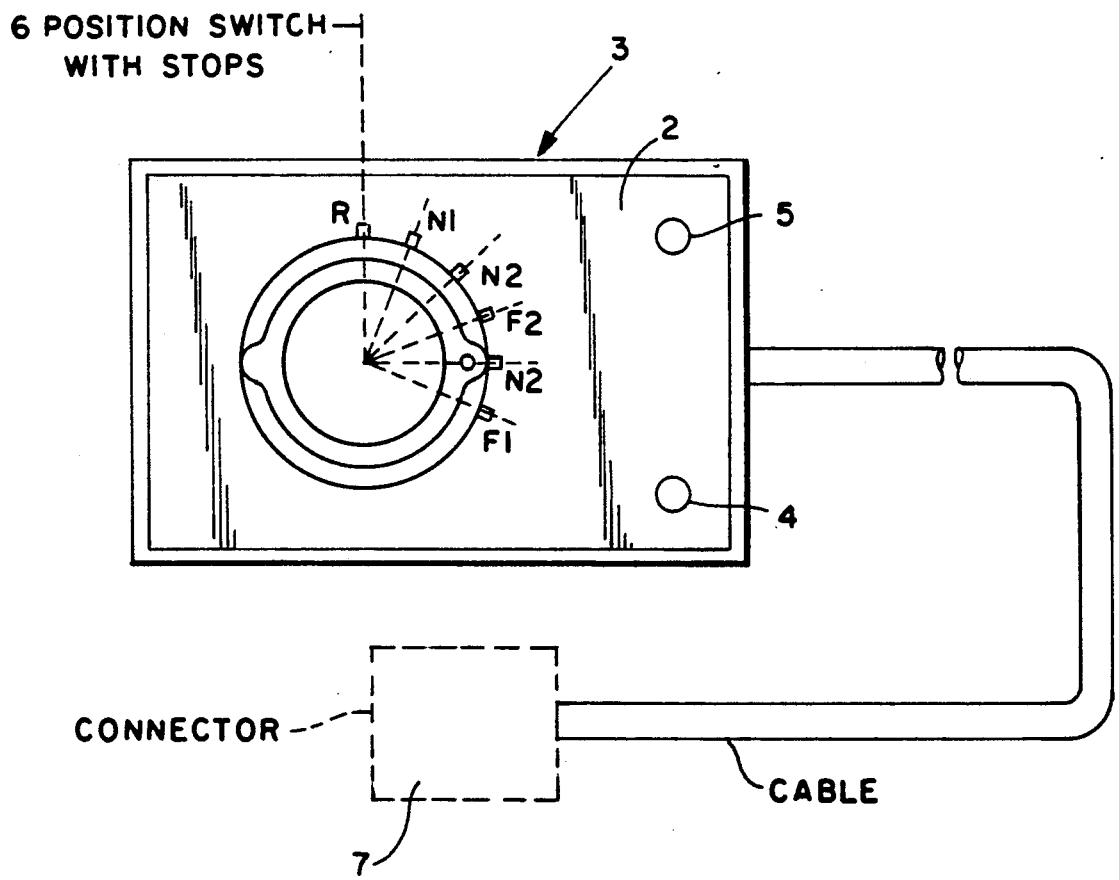
FIG. 2 shows an emergency switching box, and plural switching positions in a succession.

Referring now to FIG. 2, an emergency switching device 3 has, as seen on its panel 2, a series or chain of switchable positions which have to be switched through in one sequence R, N1, N2, F2 or vice versa. The switch may move linearly or be a dial switch as shown. Also seen are further switch positions N2, F1 in preferred but slightly more complicated limp-home versions allowing two forward gears instead of only one to be available in the emergency (assuming that the X-Y drivers are all operative). The switch is not continuously rotatable, but has a most clockwise and most counterclockwise position, accordingly, it is not possible to switch directly between either the F1 or the F2 positions, and the R position.

The switching device 3 includes a flexible cable and a second flexible cable connector 7 adapted to be received in and cooperate with connector 50 associated with the X-Y shifter 30. Both connector 7 and connector 50 are detachable to provide a selectively detachable facility for the connectors. Referring to FIG. 1 as well, the switch references correspond to gear positions R, N1, N2, F2 (N2 and F1).

The illustrated limp-home device 3 also has two, preferably green, LED's or other visual indicators, green to indicate "no-fault", one referenced 5 can show that the correct (solenoid) load is seen by the output of device 3 at each switch position. The second LED 4 can show that the correct voltage (e.g. 24V) is being applied. Positive indications, i.e. illuminated LED's showing satisfaction, rather than red warning lights, are preferred because the apparently desirable lack of a warning light can sometimes be caused by a defective or absent LED or bulb, or wiring, or voltage source. Hence, only illuminated lights 4 and 5 should permit confident use of the emergency system. LED 5 should illuminate for all positions of the switch, or at least only the positions accompanied by LED 5 illumination should be confidently relied upon.

If the switch is at position N1 of FIG. 3, the selection finger will be at position N1 of FIG. 1. The X solenoids will be in a left-driving condition opposite reverse and the Y-solenoids in a midway driving condition, tending to drive the finger midway between up and down as viewed, in the neutral slot.

In order to engage reverse R, from the N1 switch position, the switch on panel 2 is switched to R, and this engages a combination of Y-solenoids such that the finger is driven upwards as viewed to position R in FIG. 1.

In order to select forward, the switch is switched back through to N1, then onward to N2 with an X movement (see FIG. 1), which is a preparatory neutral to enter alley AF2; subsequent switching to switch position F2, see FIG. 1, will give the necessary Y movement downwards. Re-engagement of reverse from F2 requires the opposite motion of the switch, and causes the opposite motion of the gear switching finger (74 in FIG. 3).

It is highly to desirable to make it virtually impossible to engage a forward gear instead of a reverse gear, or vice versa. This cannot be guaranteed by guards or mechanical interlocks etc. on the switch unit 2 because the switches or solenoids or wiring may fail and cause erroneous movements of the finger. The first safeguard is having the two indicators 4 and 5 which indicate strong likelihood that the 24 volts is on and that at least the requisite number of solenoids or other types of driver are operative electrically. The second safety feature is that the reverse gear alley AR on the plan of FIG. 1 is not opposite any forward gear alley such as AF2 (or AF1). If F1 were selected by the electrics in error for N2 or F2, this is not considered quite so potentially dangerous.

Also as a safeguard, the switch is designed so that F2 and R can only be attained from the other after built-in pauses while passing through neutral positions N2 and N1 (or vice versa). This can be arranged by electrical or mechanical interlocking, if the reverse alley AR does confront a forward alley, such as AF2, in other designs of transmission.

A further safeguard is to design the switching and select the available gears, so that only one solenoid driver is changed as one moves from one switch position to another. This may involve more than two neutral positions N between R and the nearest F, i.e. F2.

The "SAMT" transmission as presently embodied has another characteristic, namely that the finger positions and hence the gears themselves do not shift when any one or more solenoids are deactivated. This is disadvantageous in that after a failure or stall, the transmission may be in an unknown, humanly unremembered ratio, because mechanically the last state is remembered.

However, this has one advantage as regards avoiding as far as practicable dangerously unpredictable shifts (except as a very remote possibility). The Y mid point, i.e. the neutral slot corresponds to two particular solenoids S1, S3 being on. However, if the mainbox is already in neutral, solenoid S3 can be safely switched off without a Y- movement out of neutral.

Therefore there may be a third neutral N3 intermediate the neutrals N1 and N2; N3 is not shown on FIG. 3 because it is an extra complication often not justified by the extra fail-safety. The reader is returned to this point below, accompanied by a switching table which may be relevant only to the "SAMT" and other powered "Twin-Splitter" based automatic/semi-automatic transmissions of Eaton Corporation which happen to use electrically powered shifting.

Meanwhile another refinement is pointed out in FIG. 2, i.e. there is another N2 position, and also an F1 position. Referring to FIG. 1, the N2 switch position (of FIG. 2) switches the finger back to the N2 finger position of FIG. 1. Then the final F1 switch position will select the F1 gear in the alley AF1, i.e. the lowest mainbox gear, perhaps to negotiate a hill or to drive over a curb etc. off the road for repairs. The F1 facility, of a second available forward gear is a luxury, and the simplest form of the invention will make available only one emergency forward gear such as F2 out of those designed into the box for normal use.

Table 1 shows a solenoid energization pattern used in the "SAMT" transmission:

TABLE 1

| Switch Position | Solenoids Energized | | |
|---|---|---|---|
| R | S1 | S2 | S5 |
| N1 | S1 | S3 | S5 |
| (N3 | S1 | S3 | S6) |
| N2 | S1 | S4 | S6 |
| F2 | S3 | S4 | S6 |

Table 1 shows that positions R and F2 of the switch of FIG. 1 involve different solenoids, none in common, so that potentially dangerous electrical confusion between the reverse and second forward is most unlikely. If an F1 position is provided as shown in FIG. 1, there is less chance of confusion, due to there being two more switch positions between R and F1. Solenoids or drivers S1-S6 correspond to the solenoids 150-160 illustrated in FIG. 3.

The emergency unit of FIG. 1 is arranged to check, after each manipulation of the switch, the condition of the specific solenoids and associated wiring scheduled to be energized. If the electrical resistance is incorrect, the no fault light 5 will not switch on for that new position of the switch. Thus the driver is warned of a problem, or even the unit could be immobilized. However, in one preferred embodiments, he is not thus prevented altogether from using the emergency unit, only warned to be careful. These two factors obviously make electrical confusion doubly unlikely.

Table 1 also shows N2 as not having S3 energized, whereas S1 and S3 should both have to be ON in order to achieve the midpoint Y position of the finger. However, the ON condition of S3 is "remembered", because N2 has been reached from either F, or N3 if used, or N1, all of which have S3 energized ON. Strictly, N2 should have four solenoids ON, namely S1, S3, S4 and S6.

The unit of FIG. 1 has to be installed when needed, from e.g. storage in the glove box of the cab of a vehicle to a convenient position adjacent the drivers, e.g. the X-Y drivers S1-S6, especially in the case of the "SAMT" X-Y shifter unit of FIG. 3. It is placed electrically in the flex to the drivers. For instance, the flex may contain six solenoid leads, one lead return or earth, and a 24 volt supply lead for the solenoids, and the two no-fault indicators such as LED's. The rotary or linear switch has a minimum of four positions. If there are two forward ratios, the synchronization with a moving shift must be manual (double clutching or the like).

It is envisaged that all transmissions which are to be equipped with the limp-home switch unit of the invention will have a detachable connection in the flexible cable to the driver unit, that the switch unit will have a long enough flexible cable to reach the site of this detachable connection from the vehicle operator's cab; and that in emergencies the operator will have emergency access (and instructions, tools etc.) to the detachable connection. The unit would then be switched to N1 or N2, the connection would then be detached (at the breakdown site), and the limp-home unit (still in neutral) connected in.

Once connected, the ignition should be switched on, and the power-on LED 4 of the unit 3 should glow. The solenoid no-fault LED or light 5 should also glow unless the mainbox is not in neutral. The switch should now be operated to the, or each, forward positions F, at each of which light 5 should again illuminate (if the gear has been successfully achieved). Likewise reverse position R of the switch should be checked for glowing of LED 5. All this checking had best be accomplished before any attempt to move off from the breakdown site. If the LED 5 fails to illuminate, the unit may be arranged to immobilize the solenoids. Alternatively and preferred, operation in any switch position is not prevented but the vehicle driver has been warned that something may be amiss and he should proceed with particular caution. As aforesaid, any shift between F1 and F2 must take into account engine speeds and road conditions. The Eaton Corporation "Twin Splitter" transmission, which forms the mechanical basis of the "SAMT" transmission, is fairly easy to shift without doing more than crossing through a state of engine and road speed synchronization.

In the case of a vehicle with an automatic transmission having the throttle input fed into a signal processor of some sort, a manual throttle bypass will have to be provided ready on the vehicle, or some sort of temporary entirely manual throttle will have to be installed on the road.

Although the present invention has been set forth with a certain degree of particularity, it is understood that various modifications are possible without departing from the spirit and the scope of the invention as hereinafter claimed.

We claim:

1. A transmission with limp-home facility comprising a set of electrically initiated shifting drivers (S1-S6, 150-160), a first flexible electrical cable connector having a first end portion (50) to connect the drivers and a second end portion having detachable facility to break a connection, a detachable electrical emergency (limp-off) switch unit having a second flexible electrical cable connector (7) so terminated as to be connectable into said first flexible electrical cable connector to at said detachable facility; wherein the switch unit comprises a series of at least two neutral switching positions (N1, N2) between a reverse ratio selection position (R) and each forward ratio selection position and the shifting drivers (S1, S2, S5) appropriate to select reverse are all different from the shifting drivers (S3, S4, S6) appropriate to select the forward ratio or ratios—whereby said electrical energy switch unit is used in a himp-home mode when a transmissions control has malfunctioned (F2).

2. The transmission of claim 1 wherein the neutral switching positions correspond to preparatory neutral selections which are located opposite a reverse ratio alley (AR) and a forward ratio alley (AF2) spaced crosswise therefrom i.e. along a neutral slot.

3. The transmission of claim 2 wherein the transmission is such that there is no forward ratio alley opposite the reverse ratio alley (AR).

4. The transmission of claim 3 wherein there are six switch positions, corresponding to, in series succession, a reverse (R) of a shift pattern of the transmission, a neutral (N1) confronting reverse, a neutral (N2) confronting a forward ratio (F2), the forward ratio again (F2), the confronting neutral again (N2), and a second forward ratio (F1).

* * * * *